(12) United States Patent
Venable et al.

(10) Patent No.: US 7,723,974 B1
(45) Date of Patent: May 25, 2010

(54) PLANISHING APPARATUS AND METHOD

(75) Inventors: Richard Allen Venable, Grant, AL (US); Kenneth Glenn Ezell, Madison, AL (US); David Eugene Hartley, Pearl River, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/450,037

(22) Filed: Nov. 29, 1999

Related U.S. Application Data

(62) Division of application No. 09/134,634, filed on Aug. 14, 1998, now Pat. No. 6,123,249.

(60) Provisional application No. 60/083,398, filed on Apr. 29, 1998.

(51) Int. Cl.
*G01R 33/02* (2006.01)
*G01B 7/00* (2006.01)
*G01B 7/31* (2006.01)

(52) U.S. Cl. .................... 324/67; 324/207.26

(58) Field of Classification Search .......... 324/67, 324/328, 326, 207.26, 207.29, 207.2, 207.21
See application file for complete search history.

(56) References Cited

U.S. PATENT DOCUMENTS

| | | | | |
|---|---|---|---|---|
| 4,068,163 A | * | 1/1978 | Foxworthy | .................. 324/228 |
| 5,434,500 A | * | 7/1995 | Hauck et al. | .................. 324/67 |
| 5,625,289 A | * | 4/1997 | Daetz et al. | .............. 324/207.2 |

\* cited by examiner

*Primary Examiner*—Bot L LeDynh
(74) *Attorney, Agent, or Firm*—Duane Morris LLP

(57) ABSTRACT

Planishing or stress relief in a welded joint (34) is accomplished with a hammer (12) and a backing bar (26). The hammer is applied on a first side (1) to a first surface (31) of the structure (30). To indicate the proper position of the backing bar, a first magnet (20; 320) is associated with the hammer, and a magnetic sensor arrangement (24; 224; 300) is located on the other side (2) of the structure. In one embodiment, the sensor arrangement is a second magnet (24) which is held in place by the magnetic field (40) of the first magnet. In a second embodiment, the sensor includes a line array (262) of individual sensors, each associated with an indicator of a line array (264) of indicators. In a third embodiment, the sensor includes a line array (300) of two magnetic sensors, which are coupled to a differential indicator (324).

1 Claim, 5 Drawing Sheets

PLANISHING APPARATUS AND METHOD

This is a division of U.S. patent application Ser. No. 09/134,634, filed Aug. 14, 1998 now U.S. Pat. No. 6,123,249 by R. A. Venable, K. G. Ezell, and D. E. Hartley.

The invention described herein was made in the performance of work under NASA Contract No. 36200 and is subject to the provisions of section 305 of the National Aeronautics and Space Act of 1958 (42 U.S.C. 2457).

This application claims priority of Provisional Patent Application Ser. No. 60/083,398, filed Apr. 29, 1998.

FIELD OF THE INVENTION

This invention relates to techniques for planishing or stress relieving joints, welds or the like in substantially planar structures.

BACKGROUND OF THE INVENTION

When fabricating large structures such as external propellant tanks for the Space Shuttle, large sheets of aluminum alloy are curved and welded along joints to define the overall shape of the tanks. The welding is preferably performed by automatic welding machinery, such as, for example, that described in U.S. Pat. No. 5,483,039, issued Jan. 9, 1996 in the name of Gallagher. It has been found that stress relieving or planishing of the welded joint is advantageous, as described, for example, in U.S. patent application Ser. No. 08/803,481, filed Feb. 20, 1997 in the name of Shah et al. As described therein, planishing is accomplished by use of a planishing hammer applied to the weld on one side of the structure, and a backing or bucking bar held in a corresponding location on the other side of the structure.

It will be appreciated that the metal from which the propellant tank of the Space Shuttle is fabricated may, in some locations, be relatively thin, for weight minimization. During the planishing operation, the backing bar must be applied to the reverse side of the plates being welded, to prevent damage or actual puncturing of the plates by the hammer. As mentioned, the tanks are very large, so a human operator and either a backing bar or a power hammer can easily be accommodated within the tank, and the curvature of the plates is so large that, at any particular location, the joint or weld to be planished lies in an essentially planar structure.

It has been found to be difficult to reliably maintain the backing bar at a position on one side of the structure which corresponds to the location of the head of the planishing hammer. While the weld is visible from both sides of the structure, the exact position along the weld which is being planished must be identified to within the diameter of the backing bar. Attempts have been made to use radio communications to give instructions and information across the welded walls, but this has not proven to be effective.

Improved arrangements for identifying the location of a planishing hammer are desired.

SUMMARY OF THE INVENTION

Thus, an assemblage of parts according to an aspect of the invention is suited for planishing a preferably nonmagnetic, generally planar structure including first and second broad surfaces. The assemblage of parts comprises a planishing hammer including a body, a hammer head, and driving means coupled to the body and to the head, for driving the hammer head in a fore-and-aft direction in a reciprocating manner over a range of travel. In use, the head of the hammer is applied to or held against the first broad surface of the planar structure. The assemblage of parts includes a first magnet, and a first magnet support arrangement coupled to the body and to the first magnet, for supporting the first magnet at a fore-aft location, measured from the first surface adjacent the range of travel, which position is laterally displaced from the head relative to the fore-aft direction. As a result of support of the first magnet in this manner, the magnetic field of the first magnet penetrates the planar structure when the head is adjacent the first broad surface. The assemblage of parts further includes a second magnet adapted to be located on the second broad surface of the planar structure, and to be held in place against the second broad surface of the planar structure by the magnetic field of the first magnet. A backing piece or bar of the assemblage of parts is adapted to be held against the second broad surface at the joint or weld of the planar structure, at a location identified by the location of the second magnet.

In one embodiment of the invention, the first magnet support arrangement comprises an elongated rod extending in the fore-and-aft direction; the support arrangement includes fore and aft ends. The first rod terminates at the fore end at the first magnet. The first magnet support arrangement also includes an affixing arrangement coupled to the body and the rod. The affixing arrangement is affixed to the rod at a location lying between the fore and aft ends.

A method according to an aspect of the invention is for planishing an elongated, visible joint in a nonmagnetic, generally planar structure including first and second broad surfaces. The method includes the step of procuring an assemblage of parts similar to that described above. More particularly, the procuring step procures (a) a planishing hammer including a body including a hammer head and driving arrangement coupled to the body and the head, for driving the hammer head in a fore-and-aft direction in a reciprocating manner over a range of travel;

(b) a first magnet;

(c) first magnet support arrangement coupled to the body and to the first magnet, for supporting the first magnet at a fore-aft location generally adjacent the range of travel, and laterally displaced from the head relative to the fore-aft direction;

(d) a second magnet; and (e) a backing piece.

The method further comprising the step of, on a first side of the planar structure adjacent the first broad surface, holding the hammer with the head against the joint on the first broad surface of the planar structure, and with the first magnet at a location which is on a line orthogonal to the direction of elongation of the joint at the location of the head, whereby the magnetic field of the first magnet penetrates the planar structure to the second side thereof. The method also includes the further step of, on a second side of the planar structure adjacent the second broad surface, placing the second magnet on the second surface within the magnetic field of the first magnet, as a result of which the second magnet is attracted toward the first magnet. The backing piece is placed on the second broad surface at a location on the elongated joint at which a line extending from the second magnet to the elongated joint joins the joint orthogonally. An important step in this method is selection of the strength of the first and second magnets in conjunction with at least one of the thickness and the material of the structure as measured between the first and second broad surfaces, in such a manner that the second magnet is held against the second broad surface of the planar structure by the magnetic field produced by the first magnet. The planishing method further includes operation of the hammer so that the head strikes the joint on the first surface of the structure.

According to another manifestation of the invention, a sensor arrangement providing an indication in one dimension of the location of a hidden magnet. The sensor comprises a set of a plurality of magnetic sensors arrayed in a straight line in an array direction. Each of the magnetic sensors is capable of responding to the strength of a magnetic field by adopting or changing an electrical characteristic. A set of a plurality, no less in number than the number of the plurality of magnetic sensors, of electrically actuated indicators is arrayed in a direction parallel to the array direction. A source of electrical energy, which may be a battery, is provided, and a control arrangement is coupled to the source, to the arrayed set magnetic sensors and to the arrayed set of indicators, for providing an indication of the position along the array of magnetic sensors at which the magnetic field is greatest. In a preferred embodiment of this manifestation, each of the electrically actuated indicators comprises a solid-state light emitter, which may be a light-emitting diode or a laser. The preferred magnetic sensors include solid-state devices such as Hall-effect devices or Giant Magneto-Resistive sensors. In a particular version of this manifestation, the number of the plurality of the magnetic sensors exceeds two, and the control arrangement comprises an array of electrical conductors. The array of electrical conductors includes individual ones of the electrical conductors which are associated only with an individual one of the magnetic sensors and with a corresponding associated one of the indicators, for allowing the flow of current through the one of the magnetic sensors and the associated one of the indicators, but not through others of the magnetic sensors and indicators. In another version of this manifestation, the number of the plurality of the magnetic sensors in the sensor arrangement is two, and the control arrangement comprises a differential processing arrangement coupled to the source of electrical energy, to the magnetic sensors, and to the indicator arrangement.

DESCRIPTION OF THE INVENTION

Figure 1A:
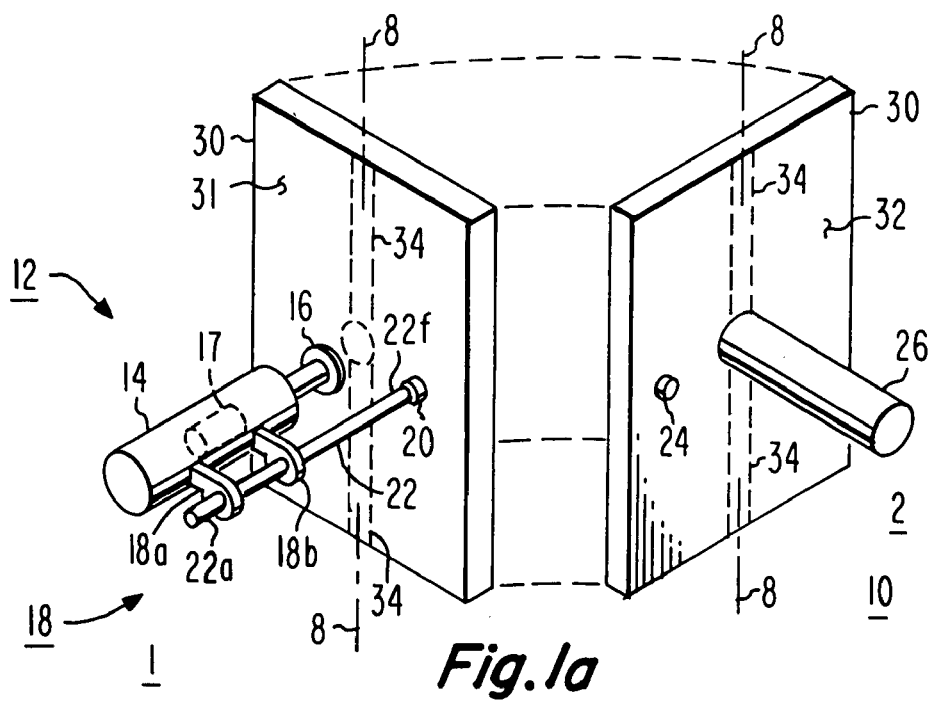
FIGS. 1a, 1b, and 1c are simplified God's-eye, plan, and front elevation views, respectively, of a nonmagnetic planar workpiece, planishing hammer, and sensor according to an aspect of the invention.
Figure 1B:
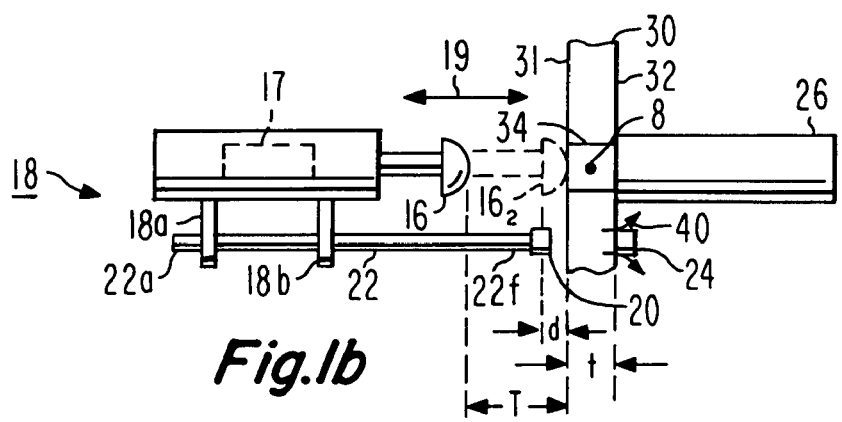

In FIGS. 1a and 1b, an assemblage 10 of parts includes a planishing hammer 12 with a body 14 and a hammer head 16. Hammer head 16 is driven in a reciprocating manner in a direction illustrated by arrows 19 by a motor 17 which is mechanically coupled to the body 14 and to the hammer head 16. Motor 17 is powered by a source (not illustrated). A magnet 20 is supported by an elongated support rod 22 defining a fore end 22f and an aft end 22a. Support rod 22 extends parallel to the direction 19 of reciprocating motion of the hammer head 16, and is fastened to the hammer body 14 by an attachment arrangement 18, which includes first and second attachments 18a and 18b. Attachments 18a and 18b couple to the support rod 22 at a location lying between fore end 22f and aft end 22a.

Assemblage of elements 10 further includes a second magnet 24 and a backing or bucking bar 26. As illustrated in FIG. 1a, a nonmagnetic plate or generally planar structure 30 is seen in God's eye view, which is to say a view in which both broad sides 31 and 32 are simultaneously visible. As illustrated, planar structure 30 has a vertically oriented elongated weld 34, which defines an axis 8 of elongation. The hammer 12 is located on a first side 1 which faces first surface 31 of planar structure 30, with hammer head 16 applied to a location along the weld 34. The second magnet 24 and backing bar 26 are located on a second side 2 of the planar structure 30. The second side 2 faces the second surface 32 of the planar structure 30. The backing bar 26 is applied to weld 34 on second surface 32 at a location corresponding to that at which hammer head 16 is applied to the first surface 31.

As mentioned above, it is difficult to determine the exact location to which the backing bar should be applied. It must be appreciated that the planar structure 30 is part of a large tank, which prevents communication around sides of the structure, which are illustrated for ease in representation. According to a first aspect of the invention, the support rod 22 is positioned so that magnet 20 is located near the forward end of the range of travel T of hammer head 16, as illustrated in FIG. 1b. The exact axial position at which first magnet 20 should be positioned will depend, in part, on the hammer reciprocation speed. If the reciprocation speed is high, the hammer body will be held at a distance from the first surface 31 which corresponds to the maximum excursion of the hammer head, represented in FIG. 1b by phantom head position $16_2$, in which case magnet support rod 22 can be positioned so that first magnet 20 lies just behind, or away from the surface 31. On the other hand, if the hammer repetition rate were very low, the hammer body would make slow excursions toward and away from the surface 31 of structure 30, in which case the rod 22 would have to be positioned so that the first magnet 20 was slightly behind the aft-most position of the hammer, in order to avoid hitting the first surface 31. Hitting of the surface 31 by the first magnet 20 is not per se objectionable, but might chip the magnet, damage the surface, or make it difficult to control the hammer's position.

First magnet 20 is selected to be sufficiently strong to produce a magnetic field 40 which penetrates through the planar structure in the context of a nonmagnetic structure, or to produce a suitable magnetic field on the second side of the structure, and to hold the second magnet in place adjacent the first magnet. The preferred type of magnet 20 is made from Neodymium Iron Boron.

Figure 1C:
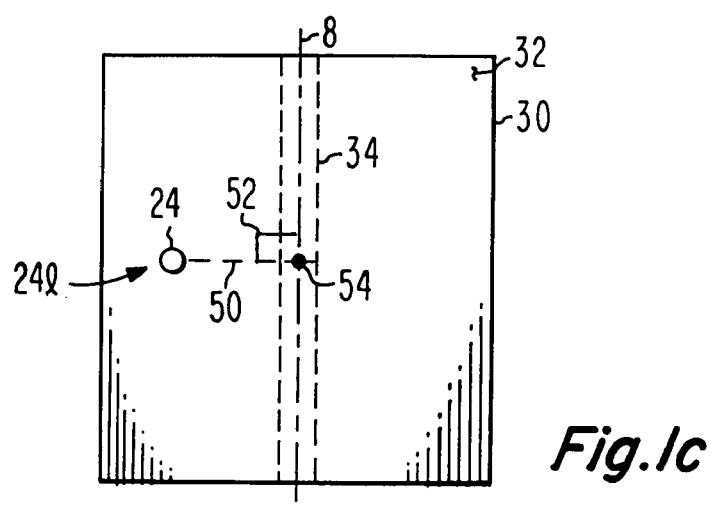

In a method according to the invention, the backing bar is located on the second side 2, and is applied to the second surface 32 of the planar structure 30 at a location selected as described in conjunction with FIG. 1c. As illustrated in the top or plan view of FIG. 1b, the hammer 12 is held so that the first magnet 20 is to one side of the joint 34. More particularly, the hammer is held so that first magnet 20 is at a location corresponding to location 24l of FIG. 1c. Location 24l is the location at which second magnet 24 is held by the magnetic field of first magnet 20. As illustrated in FIG. 1c, location 241 lies on an imaginary line 50 which is orthogonal to the axis 8 of joint 34, as suggested by right-angle symbol 52. With this positioning of the hammer 12 and first magnet 20, the second magnet 24 gives a visual indication of the location 54 to which the backing bar 26 should be applied so as to directly behind the location to which the hammer head 16 is applied. The vibration of the structure occasioned by operation of hammer 12 provides second magnet 24 with the slight mechanical energy which is required to allow it to move to follow the changing position of hammer 12 and first magnet 20 during planishing. Thus, the second magnet 24 moves with the hammer 12, and the location to which the backing bar 26 is applied is simply the orthogonal projection from the location of the second magnet 24 to the joint 34.

Figure 2A:
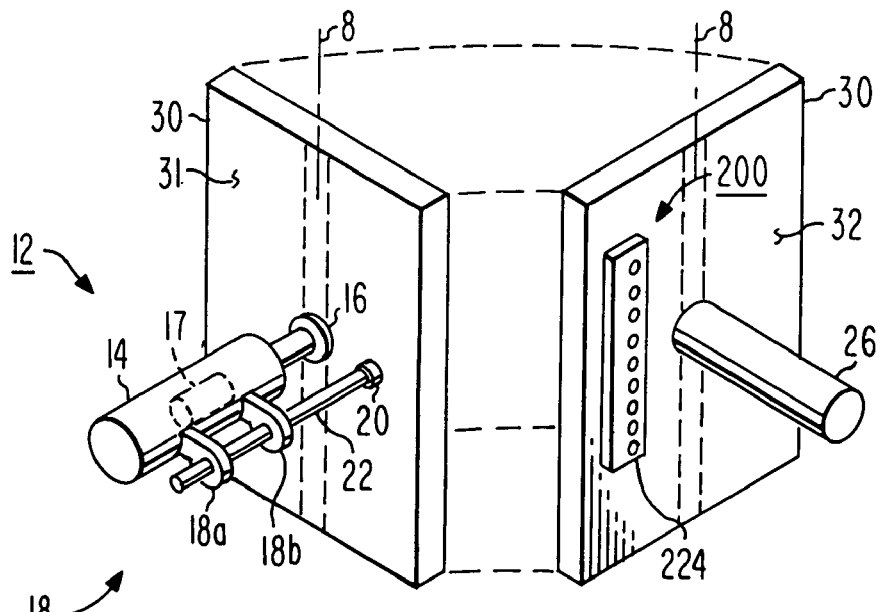
FIGS. 2a, 2b, and 2c are simplified God's-eye, plan, and front elevation views, respectively, of a planar workpiece, planishing hammer, and sensor according to another manifestation of the invention.
Figure 2B:
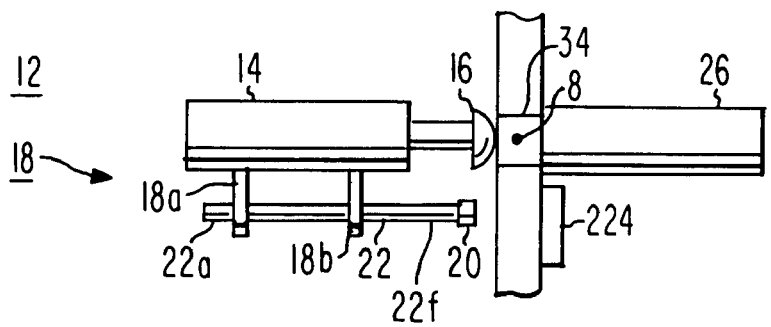
Figure 2C:
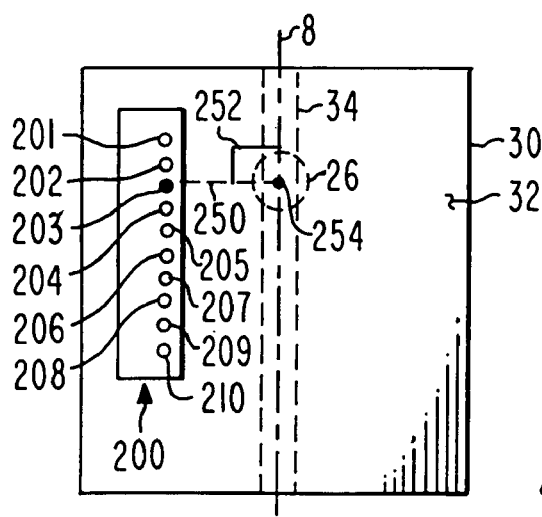

FIGS. 2a, 2b, and 2c are similar to FIGS. 1a, 1b, and 1c, and corresponding elements of the FIGURES are designated by the same reference numerals. In FIGS. 2a, 2b, and 2c, the magnetic sensor, instead of being a simple magnet 24, is a sensor arrangement designated 224. As illustrated, sensor arrangement 224 is elongated, and bears an array 200 of magnetic field indicators 201, 202, 203, 204, 205, 206, 207, 208, 209, and 210. One of the indicators, namely indicator 203, is illustrated as being illuminated (or conversely, darkened) in FIG. 2c. This identifies the location of the strongest portion of the magnetic field generated by first magnet 20 applied to the first side 31 of structure 30. The location 254 to which the backing bar 26 should be applied is determined from the illuminated (or darkened) one of the indicators of set 200 of magnetic field or strength indicators, by orthogonally (symbol 252) projecting a line 250 from the illuminated indicator 203 to the axis 8 of elongation of the joint 34.

Figure 2D:
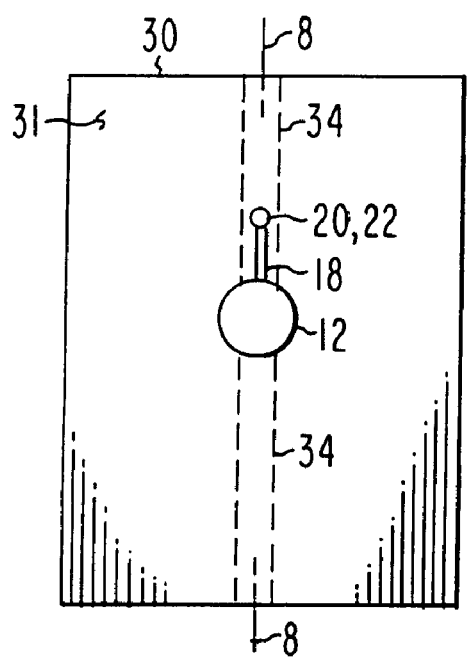
FIGS. 2d and 2e are simplified front and rear elevation views of a structure including a joint, illustrating another method for use of the sensor of FIGS. 2a, 2b, and 2c.
Figure 2E:
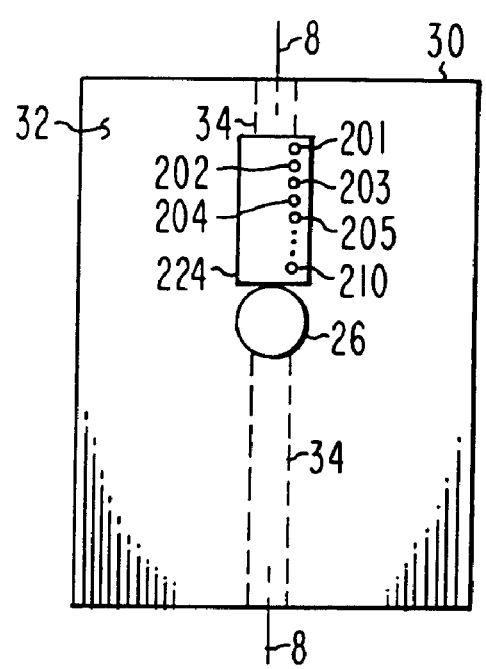

FIGS. 2d and 2e illustrate the relationships on sides 1 and 2, respectively, of planar structure 30, for a different orientation of the magnetic sensor arrangement 224. As illustrated in FIG. 2e, the sensor arrangement 224 is attached to that end of the backing bar which is adjacent to the second surface 32 of the planar structure, and is held with the sensor array oriented parallel with the axis 8 of elongation of the joint 34, which is in the vertical direction in FIG. 2e. As illustrated in FIG. 2d, the hammer 12 is held so the magnet 20 lies directly over the joint 34 being planished. The magnetic field of the magnet 20 extends through the joint, affects the array of magnetic sensors associated with sensor arrangement 224. As in the case of the embodiment of FIGS. 2a, 2b, and 2c, the sensor arrangement 224 responds by illuminating or darkening an appropriate one of the indicators, to thereby give an indication of where the magnet is located on the first side 1. In this case, the backing bar 26 is moved up or down along the joint until a particular one of the indicators of array 200 is illuminated or darkened; it should preferably be one in the center of the array, as for example indicator 205.

Figure 2F:
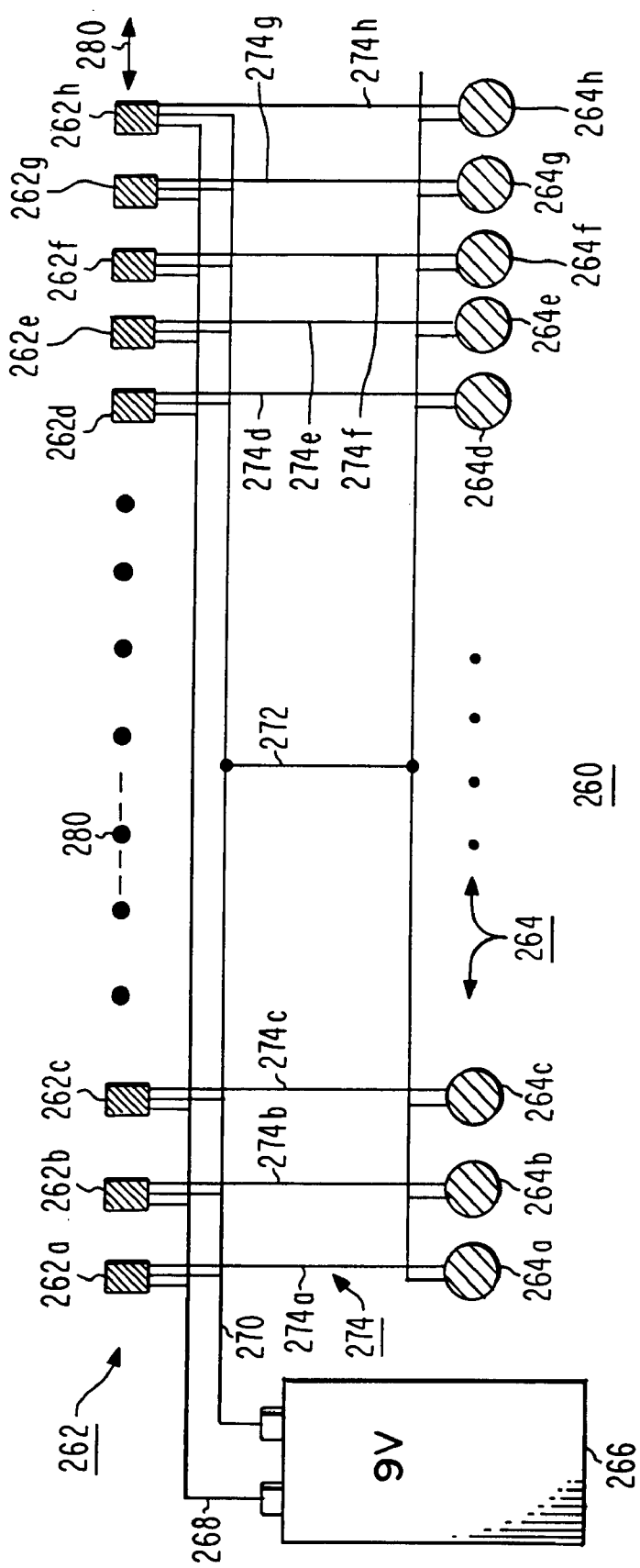
FIG. 2f is a simplified schematic diagram of the sensor of FIGS. 2a, 2b, and 2c.

FIG. 2f is a simplified schematic diagram of one embodiment of a sensor arrangement 224. In FIG. 2f, a set 262 of individual Hall-effect magnetic field sensors 262a, 262b, 262c, . . . 262d, 262e, 262f, 262g, 252h is line-arrayed parallel to a line 280. The Hall sensors are energized from a source of electrical energy illustrated as a battery 266, by way of two conductors or buses 268, 270. A set 264 of indicators 264a, 264b, 264c, . . . 264d, 264e, 264f, 264g, 264h is similarly arrayed parallel to line 280. An interconnection arrangement including a common conductor 272 and a set 274 of a plurality of individual conductors 274a, 274b, 274c, . . . 274d, 274e, 274f, 274g, and 274h interconnects the individual members of the arrayed set 262 of magnetic sensors with corresponding individual members of the set 264 of indicators. More particularly, conductor 274a interconnects sensor 262a with indicator 264a, conductor 274b interconnects sensor 262b with indicator 264b, conductor 274c interconnects sensor 262c with indicator 264c, conductor 274d interconnects sensor 262d with indicator 264d, conductor 274e interconnects sensor 262e with indicator 264e, conductor 274f interconnects sensor 262f with indicator 264f, conductor 274g interconnects sensor 262g with indicator 264g, and conductor 274h interconnects sensor 262h with indicator 264h. These individual connections control or assure that sensing of a magnetic field by one of the sensors 262a, 262b, 262c, . . . 262d, 262e, 262f, 262g, 252h illuminates only the corresponding one of the indicators 264a, 264b, 264c, . . . 264d, 264e, 264f, 264g, 264h.

Figure 3A:
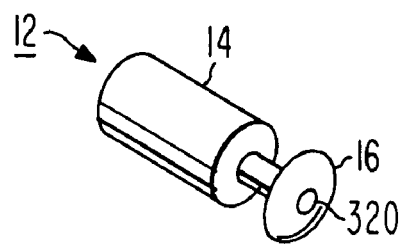
FIG. 3a is a simplified diagram of a planishing hammer with a first magnet located in the hammer head.
Figure 3B:
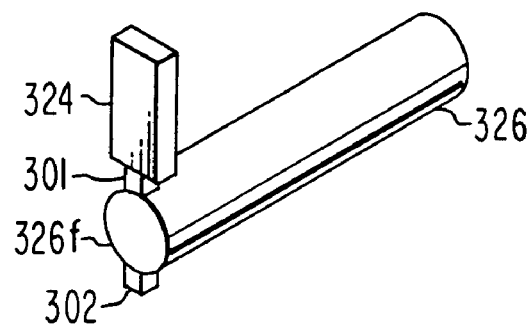
FIG. 3b is a simplified depiction of a backing bar with a two-magnetic-sensor arrangement affixed thereto for sensing the relationship of the backing bar to the magnet.

FIG. 3a illustrates a planishing hammer 12 including a body 14 and a hammer head 16. A magnet 320 is centered in hammer head 16, so its magnetic field can be sensed. In FIG. 3b, a backing bar 326 bears a sensor box 324 which is to be held above the backing bar. The backing bar also bears a set 300 of two Giant Magneto-Resistive (GMR) magnetic sensors 301 and 302, located above and below the fore end 326f of the bar. When the backing bar 326 is correctly positioned relative to the hammer head 16 of FIG. 3a, GMR sensors 301 and 302 are located above and below magnet 320 by the same distance, and so have the same resistance. When one sensor 301, 302 is closer to the magnet 320 than the other, their resistances will differ.

Figure 3C:
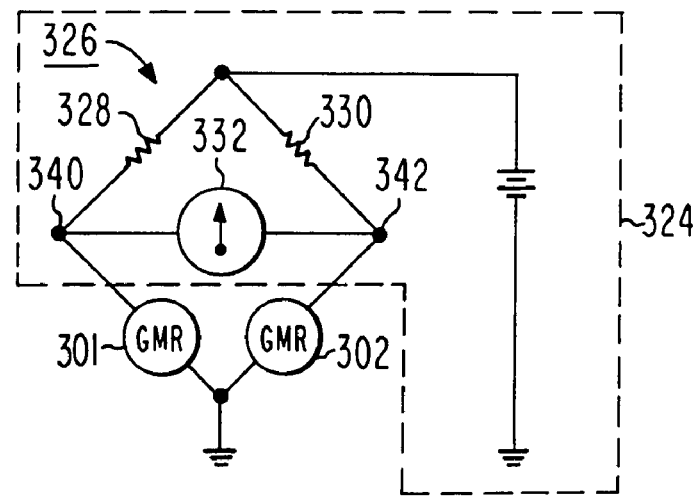
FIG. 3c is a simplified schematic diagram illustrating one possible way to produce an indication from the two sensors on the backing bar.

FIG. 3c is a simplified schematic diagram of a differential sensing arrangement for providing an indication of the relative positioning of the backing bar and the hammer head/magnet. In FIG. 3c, a battery 366 is supplies power to a Wheatstone bridge circuit 326, which includes first and second equal-value fixed resistors 328, 330 connected to the positive terminal of the battery and to the sensing terminals 340, 342, respectively, of the bridge. The GMR sensors 301, 302 are connected from the negative battery terminal (by way of ground) to sensing terminals 340, 342, respectively. A differential indicator in the form of a galvanometer 332 is coupled across the sensing terminals. Deflection of the needle of the galvanometer in one direction or the other indicates that the GMR sensors are unbalanced, and that the backing bar should be moved in the appropriate direction to equalize the magnetic fields at the GMR sensors, to thereby center the backing bar on the magnet 320. For ease of interpretation, the galvanometer 332 is preferably mounted so that the deflection of the needle indicates the direction in which the backing bar should be moved.

Other embodiments of the invention will be apparent to those skilled in the art. For example, while Hall-effect and other solid-state sensors are described, the magnetic field sensors might be as simple as magnetically actuated reed switches. The substantially planar structure 30 may be made from aluminum alloy, such as aluminum-lithium alloy, or from any other material which allows the magnetic field 40 of the first magnet 20 to penetrate to the second side 2 with sufficient strength to hold the second magnet 24 in place; this might even be a thin sheet of "soft" steel, which would allow sufficient magnetization of the material to occur so as to produce a suitable magnetic field on the second side 32 of the structure. While the number of magnetic field indicators associated with sensor arrangement 224 has been described as ten, this number is arbitrary, and could be greater or less. While a simple galvanometer circuit has been illustrated for providing a differential indication from the two-sensor version of FIGS. 3a and 3b, those skilled in the art know that many circuit configurations may be used, including electronic processing devices, and similarly that a multiple-indicator array may be used with a two-sensor indicator, if desired.

Thus, an assemblage of parts (10) according to an aspect of the invention is suited for planishing a preferably nonmagnetic, generally planar structure (30) including first (31) and second (32) broad surfaces. The assemblage of parts (10) comprises a planishing hammer (12) including a body (14), a hammer head (16), and driving means (17) coupled to the body (14) and to the head (16), for driving the hammer head (16) in a fore-and-aft direction (19) in a reciprocating manner over a range of travel (T). In use, the head (16) of the hammer (12) is applied to or held against the first broad surface (31) of the planar structure (30). The assemblage of parts includes a first magnet (20), and a first magnet support arrangement (18, 22) coupled to the body (14) and to the first magnet (20), for supporting the first magnet (20) at a fore-aft location (d, measured from the first surface 31) adjacent the range (T) of travel, which position is laterally displaced from the head relative to the fore-aft direction (19). As a result of support of the first magnet (20) in this manner, the magnetic field (40) of the first magnet (20) penetrates the planar structure (30) when the head (16) is adjacent the first broad surface (31). The assemblage of parts (10) further includes a second magnet (24) adapted to be located on the second broad surface (32) of the planar structure (30), and to be held in place against the second broad surface (32) of the planar structure (30) by the magnetic field (40) of the first magnet (20). A backing piece or bar (26) of the assemblage of parts (10) is adapted to be held against the second broad surface (32) at the joint or weld (34) of the planar structure (30), at a location identified by the location of the second magnet (24).

In one embodiment of the invention, the first magnet (20) support arrangement (18, 22) comprises an elongated rod (22) extending in the fore-and-aft direction (19); the support arrangement includes fore (20f) and aft (20a) ends. The first rod (20) terminates at the fore end (20f) at the first magnet (20). The first magnet support arrangement also includes an affixing arrangement (18) coupled to the body (14) and the rod (20). The affixing arrangement (18) is affixed to the rod (20) at a location lying between the fore (20f) and aft (20a) ends.

A method according to an aspect of the invention is for planishing an elongated, visible joint (34) in a nonmagnetic, generally planar structure (30) including first (31) and second (32) broad surfaces. The method includes the step of procuring an assemblage of parts similar to that described above. More particularly, the procuring step procures (a) a planishing hammer (12) including a body (14) including a hammer head (16) and driving arrangement (17) coupled to the body (14) and the head (16), for driving the hammer head (16) in a fore-and-aft direction (19) in a reciprocating manner over a range of travel (T);

(b) a first magnet (20);

(c) first magnet (20) support arrangement (18, 22) coupled to the body (14) and to the first magnet (20), for supporting the first magnet (20) at a fore-aft location (d) generally adjacent the range of travel, and laterally displaced from the head relative to the fore-aft direction (19);

(d) a second magnet (24); and (e) a backing piece (26).

The method further comprising the step of, on a first side (1) of the planar structure (30) adjacent the first broad surface (31), holding the hammer (12) with the head (16) against the joint (34) on the first broad surface (31) of the planar structure (30), and with the first magnet (20) at a location (241) which is on a line (50) orthogonal (52) to the direction of elongation (8) of the joint (34) at the location of the head (16), whereby the magnetic field (40) of the first magnet (20) penetrates the planar structure (30) to the second side (2) thereof. The method also includes the further step of, on a second side (2) of the planar structure (30) adjacent the second broad surface (32), placing the second magnet (24) on the second surface (32) within the magnetic field (40) of the first magnet (20), as a result of which the second magnet (24) is attracted toward the first magnet (20). The backing piece (26) is placed on the second broad surface (32) at a location (54) on the elongated joint (34) at which a line (50) extending from the second magnet (24) to the elongated joint (34) joins the joint (34) orthogonally (52). An important step in this method is selection of the strength of the first and second magnets (24) in conjunction with at least one of the thickness (t) and the material of the structure (30) as measured between the first (31) and second (32) broad surfaces, in such a manner that the second magnet (24) is held against the second broad surface (32) of the planar structure (30) by the magnetic field (40) produced by the first magnet (20). The planishing method further includes operation of the hammer (12) so that the head (16) strikes the joint (34) on the first surface (31) of the structure (30).

According to another manifestation of the invention, a sensor arrangement (224) providing an indication in one dimension of the location of a hidden magnet. The sensor (224) comprises a set (262) of a plurality (eight illustrated in FIG. 2f) of magnetic sensors (262a, 262b, 262c, 262d, 262e, 262f, 262h) arrayed in a straight line (280) in an array direction (280). Each of the magnetic sensors (262a, 262b, 262c, 262d, 262e, 262f, 262h) is capable of responding to the strength of a magnetic field (40) by adopting or changing an electrical characteristic. A set (264) of a plurality (eight illustrated in FIG. 2e), no less in number than the number (eight) of the plurality of magnetic sensors (262a, 262b, 262c, 262d, 262e, 262f, 262h), of electrically actuated indicators (264a, 264b, 264c, 264d, 264e, 264f, 264h) is arrayed in a direction parallel to the array direction (280). A source (266) of electrical energy, which may be a battery, is provided, and a control arrangement (268, 270, 272, 274) is coupled to the source, to the arrayed set (262) magnetic sensors (262a, 262b, 262c, 262d, 262e, 262f, 262h) and to the arrayed set (264) of indicators (264a, 264b, 264c, 264d, 264e, 264f, 264h), for providing an indication of the position along the array (262) of magnetic sensors (262a, 262b, 262c, 262d, 262e, 262f, 262h) at which the magnetic field (40) is greatest. In a preferred embodiment of this manifestation, each of the electrically actuated indicators (264a, 264b, 264c, 264d, 264e, 264f, 264h) comprises a solid-state light emitter, which may be a light-emitting diode or a laser. The preferred magnetic sensors (262a, 262b, 262c, 262d, 262e, 262f, 262h) include solid-state devices such as Hall-effect devices or Giant Magneto-Resistive sensors (262). In a particular version (FIG. 2e) of this manifestation, the number (eight illustrated in FIG. 2e) of the plurality of the magnetic sensors (262a, 262b, 262c, 262d, 262e, 262f, 262h) exceeds two, and the control arrangement (268, 270, 272, 274) comprises an array of electrical conductors. The array of electrical conductors includes individual ones (274a, 274b, 274c, 274d, 274e, 274f, 274g, 274h) of the electrical conductors which are associated only with an individual one (262a, 262b, 262c, 262d, 262e, 262f, 262h, respectively) of the magnetic sensors and with a corresponding associated one of the indicators (264a, 264b, 264c, 264d, 264e, 264f, 264h, respectively), for allowing the flow of current through the one of the magnetic sensors (262a, 262b, 262c, 262d, 262e, 262f, 262h) and the associated one of the indicators (264a, 264b, 264c, 264d, 264e, 264f, 264h), but not through others of the magnetic sensors (262a, 262b, 262c, 262d, 262e, 262f, 262h) and indicators (264a, 264b, 264c, 264d, 264e, 264f, 264h). In another version of this manifestation, the number of the plurality of the magnetic sensors (301, 302) in the sensor arrangement is two, and the control arrangement comprises a differential processing arrangement (326) coupled to the source (366) of electrical energy, to the magnetic sensors (301, 302), and to the indicator arrangement (332).

What is claimed is:

1. A sensor arrangement for providing an indication in one dimension of the location of a hidden magnet, said sensor comprising:
   a set of a plurality of magnetic sensors arrayed in a straight line in an array direction to form an array of magnetic sensors, each of which magnetic sensors is capable of responding to the strength of a magnetic field by adopting a particular value of an electrical characteristic said set of magnetic sensors including one of (a) Hall-effect devices and (b) Giant Magneto-Resistive sensors;
   an indicator arrangement including a plurality, no less in number than the number of said plurality of magnetic sensors, of electrically actuated indicators which are one of (a) light emitting diodes and (b) lasers, said plurality of electrically actuated indicators being arrayed in a direction parallel to said array direction to form an array of indicators, whereby said electrically actuated indicators provides an indication of the location along said array of magnetic sensors at which the magnetic field is greatest;
   a source of electrical energy;
   control means coupled to said magnetic sensors and to said indicator arrangement, for providing an indication of the position at which said magnetic field is greatest; and wherein:
   the number of said plurality of said magnetic sensors in said set of magnetic sensors is two; and
   said control means comprises processing means coupled to said source of electrical energy, to said magnetic sensors, and to said indicator arrangement, for generating a signal indicative of the direction in which a backing bar should be moved.

* * * * *